J. D. McRAE.
COMBINATION FOOT REST AND ROBE HOLDER.
APPLICATION FILED MAR. 23, 1916.
1,249,156.
Patented Dec. 4, 1917.
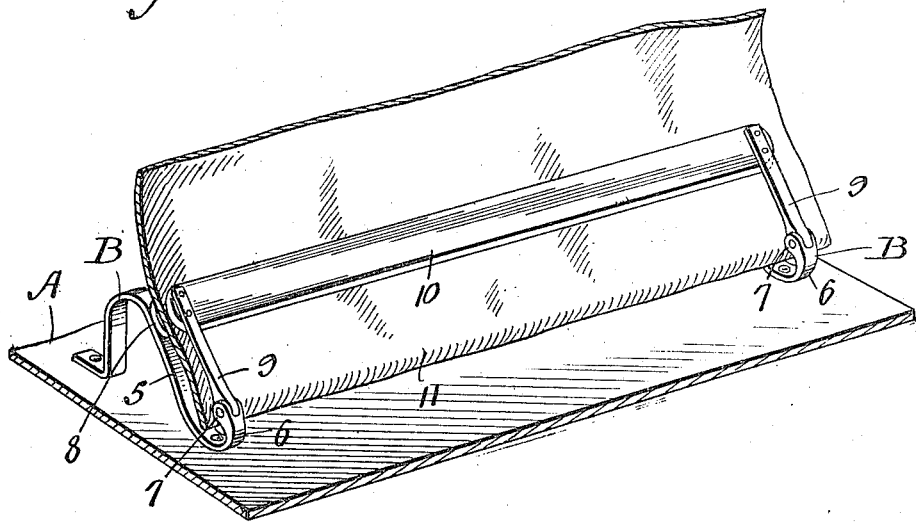
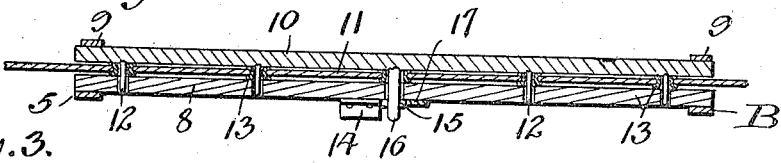
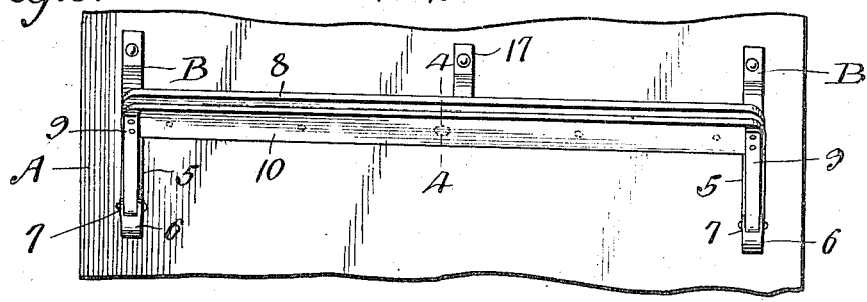
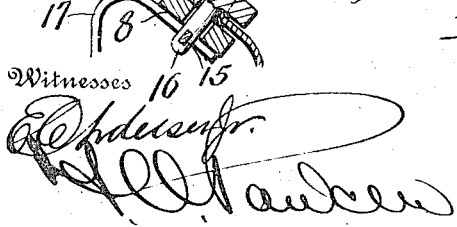
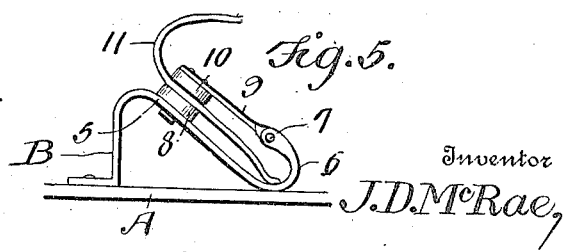
Inventor
J. D. McRae,
By Victor J. Evans
Attorney
Witnesses

UNITED STATES PATENT OFFICE.

JEFFERSON D. McRAE, OF SOCIETY HILL, SOUTH CAROLINA.

COMBINATION FOOT-REST AND ROBE-HOLDER.

1,249,156.          Specification of Letters Patent.          Patented Dec. 4, 1917.

Application filed March 23, 1916. Serial No. 86,290.

*To all whom it may concern:*

Be it known that I, JEFFERSON D. McRAE, a citizen of the United States, residing at Society Hill, in the county of Darlington and State of South Carolina, have invented new and useful Improvements in Combination Foot-Rests and Robe-Holders, of which the following is a specification.

The invention relates to a foot rest and more particularly to the class of combination foot rests and robe holders for vehicles, automobiles or the like.

The primary object of the invention is the provision of a foot rest of this character wherein the same can be mounted within the body of a vehicle, automobile or the like and is adapted to serve as a rest for the feet of the occupants of the vehicle, automobile or the like and also to secure the robe so as to prevent the same from pulling away from the feet of the occupant and also will obviate the possibility of the stealing of the robe when left within the vehicle, automobile or the like.

Another object of the invention is the provision of a foot rest of this character wherein the construction thereof is novel in form so that the same can be used as a rest for a robe holder and may be constructed in any desirable size to fit within different sizes of vehicles, automobiles or the like, and when the laprobe is fastened therein it cannot be removed from the vehicle, thereby obviating the loss of the same or the theft thereof.

A further object of the invention is the provision of a foot rest of this character which is extremely simple in construction, convenient in use, strong, durable and inexpensive of manufacture.

Other objects will be in part obvious and in part hereinafter set forth.

The invention accordingly consists in the features of construction, combination of elements and arrangement of parts which will be exemplified in the construction hereinafter described, and the scope of the application of which will be indicated in the appended claim.

In the accompanying drawings:

Figure 1 is a fragmentary perspective view of a portion of the flooring of a vehicle, automobile or the like, showing the foot rest constructed in accordance with the invention mounted thereon;

Fig. 2 is a vertical sectional view through the foot rest, showing a laprobe fastened therein;

Fig. 3 is a top plan view;

Fig. 4 is a sectional view on the line 4—4 of Fig. 3;

Fig. 5 is an edge elevation.

Similar reference characters indicate corresponding parts throughout the several views of the drawings.

Referring to the drawings in detail, A designates a portion of the flooring or bottom of the body of the vehicle, automobile or the like, on which is mounted the foot rest hereinafter described.

The foot rest comprises a pair of spaced brackets B, each being formed with a rearwardly inclined portion 5 and an upwardly and forwardly extending ear 6 having a bifurcated bearing 7, these brackets being suitably fixed to the floor or bottom A in the body of the vehicle, automobile or the like.

Fixed to the highest point of the rearwardly inclined portions 5 of the brackets B is a stationary rail 8, while pivoted in the bifurcated bearing 7 are arms 9 to which is fixed a swinging rail 10, the same being shaped correspondingly to the rail 8 and adapted to coöperate therewith for the clamping of a laprobe 11 therebetween. The rails 8 and 10 serve as a foot rest, as will be clearly apparent.

Formed on the rail 10 and protruding therefrom are a plurality of pins 12, each being adapted to engage in an eyelet 13 mounted in the robe 11 so that when the rail 10 is lowered close to the rail 8 the pins 12 will engage in the eyelets 13 in the robe 11 for securing the same between the rails and thereby holding the said robe so that it may cover the occupant of the automobile or the like without the possibility of the same pulling away from the rest.

Mounted upon the under face of the rail 8 is a lock 14, having its latch member 15 shown as engaging the keeper bolt 16. This keeper bolt 16 is carried by the rail 10 and is adapted to pass through one of the eyelets 13 and also through a suitable opening in the rail 8 whereby the bolt 16 will engage the said bolt member and thereby securely fasten the rails 8 and 10 together, thus securing the laprobe therebetween to avoid the loss of the robe or the theft thereof when left within the vehicle, automobile or the like.

It is of course understood that a suitable key can be employed for insertion in the lock 14 to release the latch member 15 to permit the swinging of the rail 8 to open position and thereby freeing the robe. Located centrally on the stationary rail 8 and depending therefrom is a brace 17 which prevents the foot rest from breaking when pressure is applied thereto.

From the foregoing description, taken in connection with the accompanying drawings, the construction and manner of use of the herein described combination foot rest and robe holder will be readily apparent and, therefore, a more extended explanation has been omitted.

Having thus described my invention, I claim:

A foot rest comprising supports, a stationary rail mounted upon the supports at their highest point, a movable rail swingingly connected to the lower end of the supports, a plurality of pins protruding from the movable rail and through the stationary rail for the clamping of a lap robe therebetween, a keeper bolt protruding from the under face of the movable rail and adapted to extend through an opening of the stationary rail, and a latching member carried by the stationary rail and passing through the keeper bolt for locking the rails together.

In testimony whereof I affix my signature in presence of two witnesses.

JEFFERSON D. McRAE.

Witnesses:
J. S. DICKSON,
A. R. BACOTE.

Copies of this patent may be obtained for five cents each, by addressing the "Commissioner of Patents, Washington, D. C."